United States Patent [19]
Scott et al.

[11] 4,414,533
[45] Nov. 8, 1983

[54] CLUTCH RELEASE MECHANISMS

[75] Inventors: Brian Scott, Halifax; Robert Duncan, Huddersfield, both of England

[73] Assignee: David Brown Tractors Limited, Huddersfield, England

[21] Appl. No.: 272,600

[22] Filed: Jun. 11, 1981

[30] Foreign Application Priority Data

Jun. 14, 1980 [GB] United Kingdom ................ 8019519

[51] Int. Cl.³ .............................................. B60Q 1/00
[52] U.S. Cl. ................................ 340/52 R; 200/61.44
[58] Field of Search ......................... 340/52 R, 52 A; 200/61.4, 61.41, 61.42, 61.44

[56] References Cited

U.S. PATENT DOCUMENTS 3,271,737  9/1966  Bezemek .......................... 340/52 A
4,290,514  9/1981  McConnell et al. ............. 340/52 A Primary Examiner—Glen R. Swann, III

[57] ABSTRACT

A vehicle clutch, when engaged, should have a predetermined clearance between its release bearing and its release plate. To disengage the clutch, a release bearing carrier sleeve is slideable to cause the bearing to contact the plate and then displace it axially. To indicate deleterious lack of clearance, the bearing has an electrically-insulating mounting and is connected to the vehicle's electric supply by a power line containing a warning light. The plate is inherently connected electrically to the vehicle's chassis, and the bearing thus acts as a switch. To prevent the light being illuminated when normal operation of the clutch occurs, the power line also contains an automatic electronic delay circuit.

10 Claims, 1 Drawing Figure

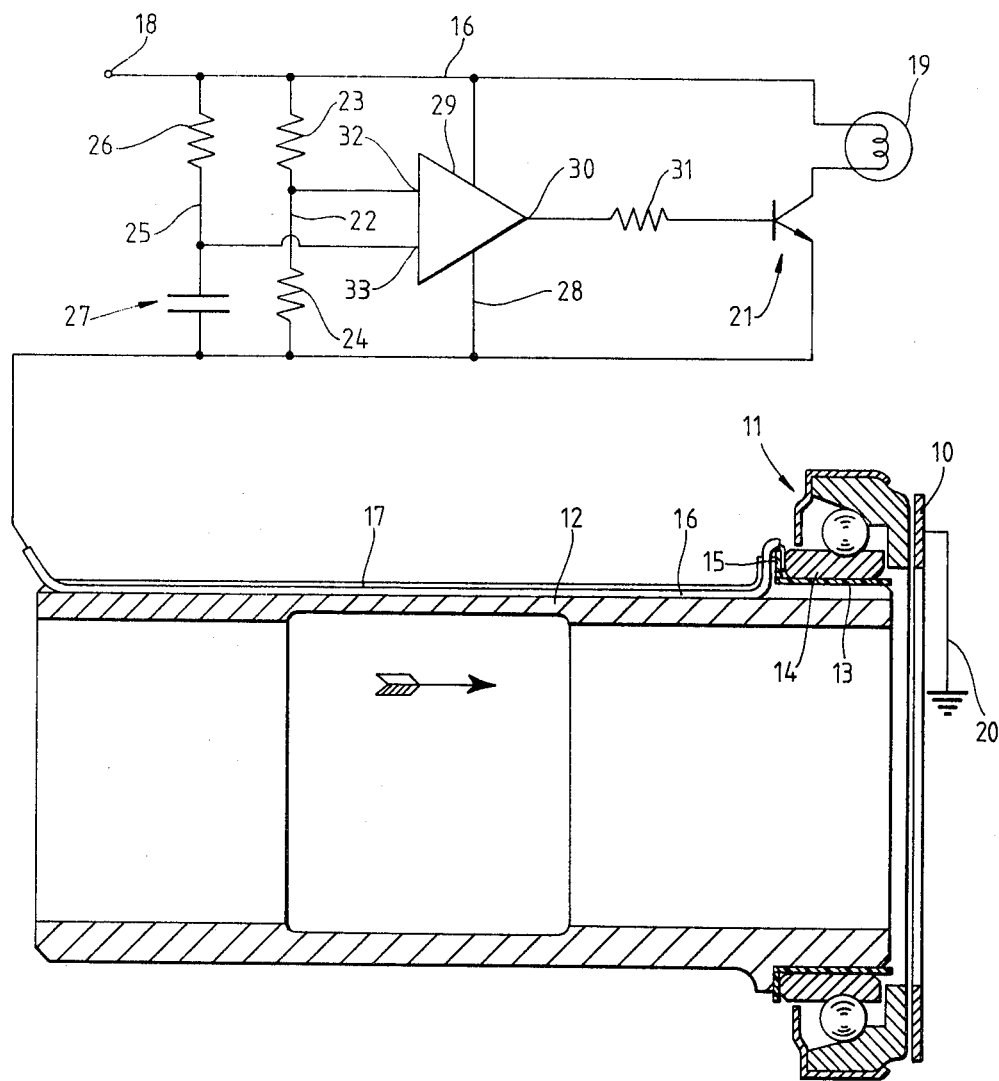

CLUTCH RELEASE MECHANISMS

BACKGROUND OF INVENTION

This invention relates to a clutch release mechanism, and more particularly to means for indicating when the clearance between a clutch release bearing and a co-operating clutch release plate is taken up. The invention is particularly, but not exclusively, applicable to vehicle clutches.

Said clearance is intended to be temporarily taken up, and the release plate then displaced axially, each time the clutch is released. There are, however, three ways in which said clearance can be deleteriously taken up, namely by incorrect adjustment of the clutch, by wear of the clutch drive plate beyond the designed limit, and by the vehicle driver simply resting his foot on the clutch pedal when not operating the clutch.

The object of the present invention is to avoid these occurrences by providing a warning when said clearance is taken up.

SUMMARY OF INVENTION

According to the invention, means for indicating when the clearance between a clutch release bearing and a co-operating clutch release plate is taken up comprise an electrically-insulating mounting for the bearing, a power line connecting an electric supply to the bearing, and a warning device interposed in said line, the clutch release plate being connected electrically to the vehicle chassis.

BRIEF DESCRIPTION OF DRAWING

A preferred embodiment of the invention will now be described, by way of example, with reference to the accompanying drawing which shows an axial section through a clutch release bearing and its carrier sleeve, and an electric circuit associated therewith.

DESCRIPTION OF PREFERRED EMBODIMENT

Referring now to the drawing, a vehicle clutch release mechanism includes a drive plate (not shown), a pressure plate (not shown), a release plate 10, a release bearing indicated generally at 11, and an axially-slideable non-rotating carrier sleeve 12 for said bearing, all of which are well known per se and operate in conventional manner. Instead of the release bearing 11 being pressed directly on to its carrier sleeve 12 in the usual way, an electrically-insulating layer is disposed between said bearing and said sleeve. Said layer consists of a plastics sleeve 13 disposed between the bore of an inner race 14 of the bearing 11 and its seating on the carrier sleeve 12, and a plastics washer 15 disposed between a shoulder on the carrier sleeve 12 and the adjacent end face of the inner race 14. An insulated wire, herein referred to as the power line 16, is secured by adhesive in an axial slot 17 formed in the periphery of the carrier sleeve 12, and its bared end is connected to the inner race 14 between said end face thereof and the plastics washer 15. The other end of the power line 16 is connected at 18 to an electric supply of, say, 12 volts, and a warning light 19 mounted on the vehicle instrument panel (not shown) is interposed in said line. The release plate 10, due to its conventional mounting arrangement, is inherently connected electrically to the vehicle chassis (not shown) which constitutes in known manner the return shown symbolically at 20 to the electric supply. Thus the release bearing 11 and the release plate 10 together act as a switch to complete the circuit and illuminate the warning light 19 when the clearance between said bearing and said plate is taken up. The invention can be used perfectly well in the form thus far described, but the warning light 19 will be illuminated unnecessarily each time that normal operation of the clutch occurs. We therefore interpose an automatic delay circuit, including a switch consisting of a transistor 21, in the power line 16. A delay of, say, 7 seconds is sufficient to prevent illumination of the warning light 19 during normal operation of the clutch. The delay circuit comprises a first line 22 connected in parallel with the warning light 19, two resistors 23 and 24 being disposed in series in the first line 22, a second line 25 connected in parallel with the warning light 19, a resistor 26 and a capacitor 27 being disposed in series in the second line 25 with the resistor 26 upstream of the capacitor 27; and a third line 28 connected in parallel with the warning light 19, an operational amplifier connected as hereinafter described so as to operate as a voltage comparator 29 being interposed in the third line 28. The transistor 21 is interposed in that part of the power line 16 in parallel with the first, second and third lines 22, 25 and 28 respectively and containing the warning light 19, and is connected to an output point 30 of the voltage comparator 29 by way of a resistor 31. One input point 32 of the voltage comparator 29 is connected to the first line 22 at a point between the two resistors 23 and 24 in said line, and another input point 33 thereof is connected to the second line 25 at a point between the resistor 26 and the capacitor 27 in said line.

In operation, immediately the clearance between the release bearing 11 and the release plate 10 is taken up, current can pass through the first, second and third lines 22, 25, and 28 respectively. Thus a fixed voltage of an amplitude determined by the relative values of the two resistors 23 and 24 in the first line 22 is applied to the input point 32 of the voltage comparator 29, and a voltage which increases progressively from zero at a rate determined by the respective values of the resistor 26 and the capacitor 27 in the second line 25 is applied to the input point 33 of said comparator. The values of the three resistors 23, 24 and 26 and the value of the capacitor 27 are chosen so that the increasing voltage equals the fixed voltage when the desired delay has elapsed. When this occurs the voltage at the output point 30 of the voltage comparator 29 changes instantaneously from zero to the full supply voltage, and actuates the transistor 21 so as to complete the circuit through the power line 16 and thus illuminate the warning light 19. The resistor 31 disposed between the output point 30 of the voltage comparator 29 and the transistor 21 acts to limit the current passing from said point to the transistor 21 so as to prevent said comparator overheating.

In a modification, the warning light 19 is replaced by an audible warning device. In another modification, the clutch release bearing carrier sleeve is formed entirely of electrically-insulating material having suitable mechanical properties.

We claim:

1. Means for indicating take-up of the clearance between a release bearing of a friction clutch and a release plate thereof against which said bearing abuts whenever the clutch is released comprising an electrically-insulated mounting for the bearing, a power line connecting an electric supply to the bearing, a warning device interposed in said line, and a return line connecting the release plate to the electric supply.

2. Means according to claim 1, wherein the warning device is a light.

3. Means according to claim 1, wherein the electrically-insulated mounting for the bearing comprises an electrically-insulating layer disposed between the bearing and an axially-slideable clutch release bearing carrier sleeve.

4. Means according to claim 1, wherein an automatic delay circuit including a switch is interposed in the power line.

5. Means according to claim 4, wherein the switch consists of a transistor.

6. Means according to claim 5, wherein the circuit also includes a voltage comparator having an output point which supplies power to actuate the transistor as soon as a fixed voltage, applied to one of its input points when the clearance is taken up, is equalled by an increasing voltage, applied to another of its input points when the clearance is taken up.

7. Means according to claim 6, wherein a resistor is disposed between the output point of the comparator and the transistor.

8. Means according to claim 6, wherein the fixed voltage is taken from a point between two resistors disposed in series in a first line connected in parallel with the warning device.

9. Means according to claim 6, wherein the increasing voltage is taken from a point downstream of a resistor and upstream of a capacitor disposed in series in a second line connected in parallel with the warning device.

10. Means for indicating take-up of the clearance between a release bearing of a friction clutch and a release plate thereof against which said bearing abuts whenever the clutch is released comprising an electrically-insulated mounting for the bearing, a power line connecting an electric supply to the bearing, a warning light interposed in said line, a return line connecting the release plate to the electric supply, and an automatic delay circuit interposed in the power line, said circuit including a switch consisting of a transistor, a voltage comparator having an output point which supplies power to actuate the transistor as soon as a fixed voltage, applied to one input point of said comparator when the clearance is taken up, is equalled by an increasing voltage, applied to another input point of said comparator when the clearance is taken up, two resistors disposed in series in a first line connected in parallel with the warning light, the fixed voltage being taken from a point between said resistors, and a resistor and a capacitor disposed in series in a second line connected in parallel with the warning light, the resistor being disposed upstream of the capacitor and the increasing voltage being taken from a point between said resistor and said capacitor.

* * * * *